Jan. 24, 1950 A. PINNICK 2,495,599
CASTOR FOR FURNITURE AND THE LIKE
Filed Aug. 20, 1945

Alfred Pinnick
Inventor
By Marshall and Marshall
Attorneys

Patented Jan. 24, 1950

2,495,599

UNITED STATES PATENT OFFICE 2,495,599

CASTOR FOR FURNITURE AND THE LIKE

Alfred Pinnick, Birmingham, England

Application August 20, 1945, Serial No. 611,554
In Great Britain November 22, 1944

2 Claims. (Cl. 16—26)

This invention has reference to an improved castor for furniture and the like, and essentially relates to the combination of a ball and glider castor which is adapted to be rigidly secured to the lower end of the leg of articles of furniture and may be equally well applied to other objects where castor support is required.

An essential feature of the construction of the castor is that there is provided a relatively large ball which is mounted within an anti-friction ball thrust race in which race the anti-friction balls while being permitted traverse in any direction within the restricted area of the race will provide what may be termed a universal floating or nest mounting for the anti-friction balls within the cage which constitutes a mounting for the balls and which is connected to or associated with the retaining frame for the main ball.

The invention consists of a combined ball and glider castor wherein a main ball is mounted within a cup containing a ball race which admits of an anti-friction thrust mounting or nesting of the main ball within the cup irrespective of its direction of rotation or traverse, part of the periphery of the main ball being so mounted within the cup that it projects therefrom and is located within and forms a part of a glider mounting associated with the cup, means being provided for attaching the castor to an article of furniture or the like.

The invention will now be described with reference to the accompanying drawings, in which.

Figure 1:
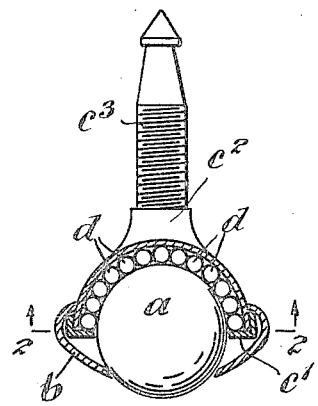
Figure 1 is a part sectional side elevation of one form of castor constructed in accordance with this invention.
Figure 2:
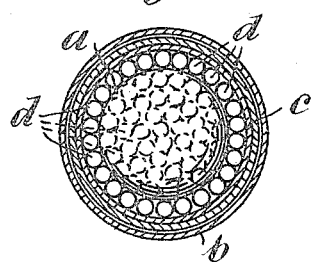
Figure 2 is a sectional plan on line 2—2 of Figure 1.

Referring first more particularly to Figures 1 and 2 of the drawings, the castor comprises a main ball $a$ of substantial diameter which is freely located within a lower cage $b$ through an opening in this cage part of the periphery of the ball $a$ can project and will form a more or less contiguous arc with the outer periphery of the cage $b$. This cage $b$ may be formed integral with the upper cage $c$ or attached thereto and within this upper cage $c$ are freely and rotatably mounted a plurality of small balls $d$ which form an anti-friction thrust bearing and mounting or nesting for the main ball $a$ within the housing of the castor. The upper cage $c$ is provided with an inwardly directed annular flange $c^1$ which serves as a retention means for the lower line of balls $d$ nested within the cage $c$.

It is to be appreciated that the nest of balls $d$ form an anti-friction race and an anti-friction thrust bearing for the main ball $a$ irrespective of the direction of traverse of the main ball or of the loading line thereof, in that the balls $d$ are permitted what may be termed a universal path of motion within the cage $c$, i. e. they are not restricted in the manner of an ordinary ball race to a particular annular path, the balls $d$ being so arranged that they can rotate and move freely within the cage in any direction which is determined by the direction of rotation and movement of the main ball $a$.

The upper cage $c$ is provided with an upstanding lug $c^2$ which extends into a screw-threaded and tapering shank $c^3$ which provides a means of mounting the castor in say the end of a leg on an article of furniture or otherwise.

It will be appreciated that other means of securing the housing of the castor may be employed without departing from the scope of the present invention.

It is also to be appreciated that the outer peripheral surface of the lower cage $b$ is intended to provide a glider surface for the castor with the extending periphery of the main ball $a$ along a carpet or other surface along which the castor is caused to traverse.

Figure 3:
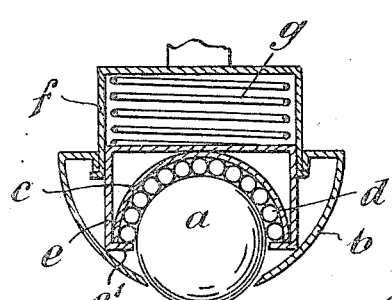
Figure 3 is a sectional elevation representing a modification of the means of resiliently mounting the ball race within the housing of the castor.

Referring now more particularly to Figure 3 of the drawings here the upper cage $c$ is contained within a slidably mounted inverted cup $e$ which constitutes what may be termed a spring-loaded cylindrical member within the cylindrical housing $f$, a coiled compression spring $g$ being interposed between the underside of the top of the housing $f$ and the top of the inverted cup $e$, the housing $f$ being in this case formed as an extension of the glider cage $b$ the inner periphery of which cage forms a stop for the ball retaining ring $e^1$ of the inverted cup $e$ and the cup $c$.

I claim:

1. A castor for furniture and the like comprising, in combination, an inverted hemispherical cup having an upwardly extending mounting means, a plurality of small roller balls covering the inner surface of said cup, a spherical castor ball nested in said roller balls in said cup, a ball retainer having a planar flange extending radially outwardly of said castor ball, the inner edge of said flange being equatorially circumjacent said castor ball, said retainer also having an upwardly extending second flange closely embracing the lip of said cup and extending upwardly and inwardly therearound forming a superimposed equatorial zone thereon of an outer diameter greater than that of said hemispherical cup, the upper edge of said second flange forming an annular ledge, and a flattened hemispherical glider having an aperture at its downwardly directed pole through which said castor ball protrudes slightly, the rim of said glider extending upwardly around the second flange of said retainer and inwardly over said ledge for retaining said glider on said castor.

2. A castor for furniture and the like comprising, in combination, an inverted hemispherical cup having an upwardly extending mounting means, a plurality of small roller balls covering the inner surface of said cup, a spherical castor ball nested in said roller balls in said cup, a ball retainer having a planar flange extending radially outwardly of said castor ball, the inner edge of said flange being equatorially circumjacent said castor ball, said retainer also having an upwardly extending second flange closely embracing the lip of said cup and extending upwardly and inwardly therearound forming a superimposed equatorial zone thereon of an outer diameter greater than that of said hemispherical cup, the upper edge of said second flange forming an annular ledge, and a flattened, hemispherical glider having an aperture at its downwardly directed pole through which said castor ball protrudes slightly, the rim of said glider extending upwardly around the second flange of said retainer and inwardly over said ledge for retaining said glider on said castor, the edge of the polar aperture in said retainer being upwardly beveled spherically on a radius slightly larger than that of said castor ball.

ALFRED PINNICK.

REFERENCES CITED

The following references are of record in the file of this patent:

UNITED STATES PATENTS

| Number | Name | Date |
|---|---|---|
| 288,633 | Hasenpflug | Nov. 20, 1883 |
| 580,407 | Klose | Apr. 13, 1897 |
| 1,033,264 | Oppy | July 23, 1912 |
| 1,082,968 | Morgan | Dec. 30, 1913 |
| 1,154,448 | Sleicher | Sept. 21, 1915 |
| 1,184,641 | Grzeskowiak | May 23, 1916 |
| 1,186,244 | Szostak et al. | June 6, 1916 |
| 1,259,103 | Hutton | Mar. 12, 1918 |
| 1,333,598 | Bedi | Mar. 16, 1920 |
| 1,370,746 | Hohenstatt et al. | Mar. 8, 1921 |

FOREIGN PATENTS

| Number | Country | Date |
|---|---|---|
| 215,908 | Switzerland | Nov. 1, 1941 |